United States Patent
Gonze et al.

(10) Patent No.: US 9,562,452 B2
(45) Date of Patent: Feb. 7, 2017

(54) SYSTEM AND METHOD FOR CONTROLLING REGENERATION WITHIN AN AFTER-TREATMENT COMPONENT OF A COMPRESSION-IGNITION ENGINE

(71) Applicant: GM GLOBAL TECHNOLOGY OPERATIONS LLC, Detroit, MI (US)

(72) Inventors: Eugene V. Gonze, Pinckney, MI (US); Michael J. Paratore, Jr., Howell, MI (US); Charles E. Solbrig, Ypsilanti, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 109 days.

(21) Appl. No.: 13/715,301

(22) Filed: Dec. 14, 2012

(65) Prior Publication Data

US 2014/0165535 A1 Jun. 19, 2014

(51) Int. Cl.

| | |
|---|---|
| *F01N 3/021* | (2006.01) |
| *F01N 3/023* | (2006.01) |
| *F01N 3/08* | (2006.01) |
| *F01N 3/10* | (2006.01) |
| *F01N 3/20* | (2006.01) |
| *F01N 3/32* | (2006.01) |
| *F01N 3/36* | (2006.01) |
| *F01N 9/00* | (2006.01) |
| *F01N 3/027* | (2006.01) |
| *F01N 3/035* | (2006.01) |

(52) U.S. Cl.
CPC ............. *F01N 3/0238* (2013.01); *F01N 3/027* (2013.01); *F01N 3/035* (2013.01); *F01N 3/0842* (2013.01); *F01N 3/0871* (2013.01); *F01N 3/103* (2013.01); *F01N 3/208* (2013.01); *F01N 3/2013* (2013.01); *F01N 3/32* (2013.01); *F01N 3/36* (2013.01); *F01N 9/002* (2013.01); *F01N 2560/025* (2013.01); *F01N 2560/026* (2013.01); *F01N 2610/02* (2013.01); *F01N 2900/0416* (2013.01); *Y02T 10/24* (2013.01); *Y02T 10/26* (2013.01); *Y02T 10/47* (2013.01)

(58) Field of Classification Search
USPC ............................ 60/274, 285, 286, 295, 297
See application file for complete search history.

(56) References Cited

U.S. PATENT DOCUMENTS

| | | | | |
|---|---|---|---|---|
| 4,835,963 | A * | 6/1989 | Hardy | ................... F01N 3/023 123/323 |
| 5,428,955 | A * | 7/1995 | Yuuki et al. | ................... 60/276 |
| 6,293,092 | B1 * | 9/2001 | Ament et al. | ................... 60/274 |
| 6,568,173 | B1 * | 5/2003 | Kolmanovsky et al. | ........ 60/280 |
| 6,988,361 | B2 * | 1/2006 | van Nieuwstadt et al. | .... 60/295 |

(Continued)

*Primary Examiner* — Thomas Denion
*Assistant Examiner* — Brandon Lee
(74) *Attorney, Agent, or Firm* — Cantor Colburn LLP

(57) ABSTRACT

A method for controlling regeneration within an after-treatment component of an engine comprises receiving a signal indicative of whether the engine is in an operating state or a non-operating state and detecting, based on the signal, when the engine has departed an operating state and entered a non-operating state. When the engine has departed an operating state and entered a non-operating state, a regeneration event is initiated. The regeneration event comprises causing a stream of air to flow through the after-treatment component and initiating a flow of fuel into the stream of air.

20 Claims, 2 Drawing Sheets

(56) References Cited

U.S. PATENT DOCUMENTS

| | | | |
|---|---|---|---|
| 7,073,465 B2 * | 7/2006 | Woll et al. | 123/1 A |
| 2002/0083700 A1 * | 7/2002 | Ellmer et al. | 60/278 |
| 2004/0206067 A1 * | 10/2004 | Birkhofer | B01D 53/30 60/273 |
| 2004/0226287 A1 * | 11/2004 | Edgar et al. | 60/295 |
| 2006/0021332 A1 * | 2/2006 | Gaiser | 60/286 |
| 2006/0090458 A1 * | 5/2006 | Marcelot | F01N 3/023 60/297 |
| 2006/0260297 A1 * | 11/2006 | Koch | 60/286 |

\* cited by examiner

SYSTEM AND METHOD FOR CONTROLLING REGENERATION WITHIN AN AFTER-TREATMENT COMPONENT OF A COMPRESSION-IGNITION ENGINE

FIELD OF THE INVENTION

Exemplary embodiments of the present invention relate to exhaust gas treatment systems for internal combustion engines and, more particularly, to particulate filter (PF) regeneration.

BACKGROUND

The emission of nitrogen oxides, i.e., NOx, particulate matter (PM), and other constituents in exhaust from internal combustion engines, such as compression-ignition engines, is regulated for environmental reasons. Thus, vehicles equipped with compression-ignition engines often include after-treatment components such as particulate filters, catalyzed soot filters and adsorption catalysts for capturing or otherwise removing the regulated constituents from their exhaust streams and/or converting regulated constituents into unregulated constituents that may be permitted to remain in the exhaust streams. For example, catalyst compositions may be provided to convert certain exhaust constituents into non-regulated exhaust gas components. Filter structures that have proven effective in removing the particulate matter from the exhaust gas include ceramic honeycomb wall-flow filters, wound or packed fiber filters, open cell foams, and sintered metal fibers.

In addition to particulates, exhaust from a compression-engine, such as a diesel engine, typically contains NOx, which consists primarily of nitric oxide (NO) and approximately 5 to 20 percent $NO_2$, with greater levels of $NO_2$ being common where oxidation catalysts are present in the exhaust stream. Production of NOx may be particularly problematic when operating lean of stoichiometric as a result of the relatively high levels of oxygen in the exhaust gas stream. Such lean conditions typically exist during cold start conditions. To address this issue, an exhaust after-treatment system may include a NOx adsorber (i.e., a lean NOx trap or LNT). In an LNT, a NOx adsorbent material, such as a zeolite, is disposed so as to trap NO and $NO_2$ molecules.

Once the NOx adsorbent material in an LNT is saturated, the effectiveness of the LNT decreases substantially, and NOx may slip past the LNT. While a NOx-producing engine is operating at sufficiently elevated temperatures, such as at typical, steady-state operating temperatures, after-treatment components positioned downstream from an LNT, such as a selective reduction catalyst component (SRC), can effectively convert the NOx contained in the exhaust stream before release to the atmosphere. Unfortunately, at relatively cool operating temperatures and lean stoichiometry, such as experienced during a cold start-up of the engine, an SRC may not be particularly effective in converting NOx. For this reason, it can be particularly important for an LNT to have sufficient adsorption capacity available when a cold start-up is initiated.

After-treatment components may be maintained either by replacing components or by periodic cleaning or regeneration. To avoid service interruptions, regeneration is generally preferred over replacement of after-treatment components. In a soot collecting component, regeneration may be accomplished by increasing the temperatures of the filter material and/or the collected particulate matter to levels above the combustion temperature of the particulate matter while exposing the particulate matter to available oxygen. Elevating the temperature facilitates consumption of the accumulated soot by allowing the excess oxygen in the exhaust gas to oxidize the particulate matter. Particulate matter may also be oxidized, and thus removed, at lower temperatures by exposing the particulate matter to sufficient concentrations of nitrogen dioxide ($NO_2$). Regeneration in an LNT may be accomplished by exposing the NOx to a hydrocarbon rich environment so as to convert the NOx to $H_2O$ and $N_2$. To ensure that an LNT has sufficient adsorption capacity available when a cold start-up is initiated, it may be advantageous to regenerate a LNT prior to initiating a cold startup.

Engine control systems can be used to predict when it may be advantageous to actively facilitate a regeneration event and to effectuate control over the regeneration process. To accomplish this, an engine control system may use a model to deduce (i.e., predict) an accumulation of regulated constituents in the after-treatment component by monitoring properties of the exhaust stream as it flows through the after-treatment component. The control system can use the deduced accumulation data to determine or anticipate when regeneration may be necessary or desirable, to facilitate a regeneration event, and/or to effectuate control over a regeneration process or other remedial measures. In one exemplary model, knowledge of the relationship between accumulation of regulated constituents and various operating parameters enable the extent of NOx loading in an LNT to be estimated. Unfortunately, there are drawbacks associated with the regeneration process. These include the fuel consumption required to regenerate the after-treatment component and exhaust emissions that are created by the regeneration process.

Accordingly, it is desirable to provide an improved system and method for determining when to facilitate active regeneration and for controlling active regeneration of an after-treatment component, with particular applicability to a lean NOx trap and with particular attention to the need for reduced consumption of fuel.

SUMMARY OF THE INVENTION

In one exemplary embodiment of the invention, a method for controlling regeneration within an after-treatment component of an engine comprises receiving a signal indicative of whether the engine is in an operating state or a non-operating state and detecting, based on the signal, when the engine has departed an operating state and entered a non-operating state. When the engine has departed an operating state and entered a non-operating state, a regeneration event is initiated. The regeneration event comprises causing a stream of air to flow through the after-treatment component and initiating a flow of fuel into the stream of air.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DESCRIPTION OF THE EMBODIMENTS

Figure 1:
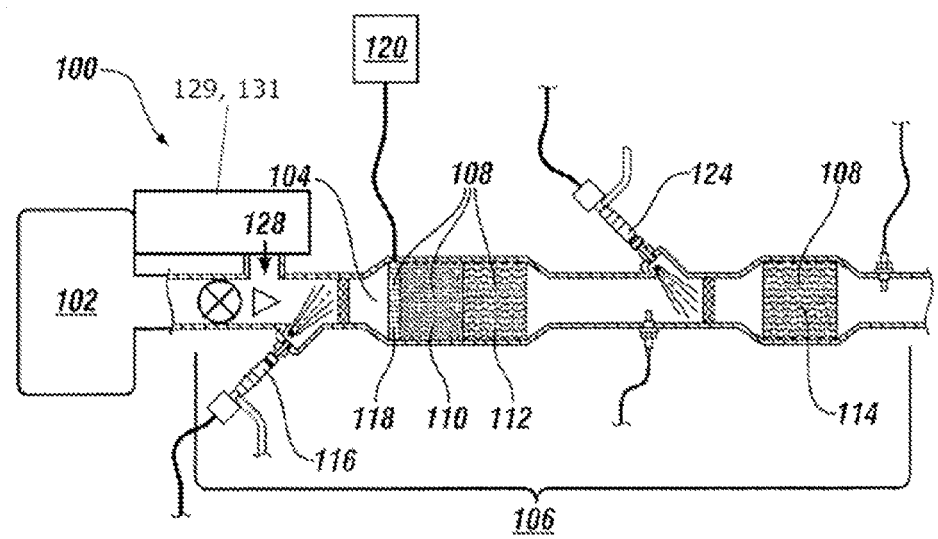
FIG. 1 is a schematic diagram showing an exemplary engine and exhaust system including after-treatment components.

The following description is merely exemplary in nature and is not intended to limit the present disclosure, its application or uses. It should be understood that throughout the drawings, corresponding reference numerals indicate like or corresponding parts and features.

Figure 2:
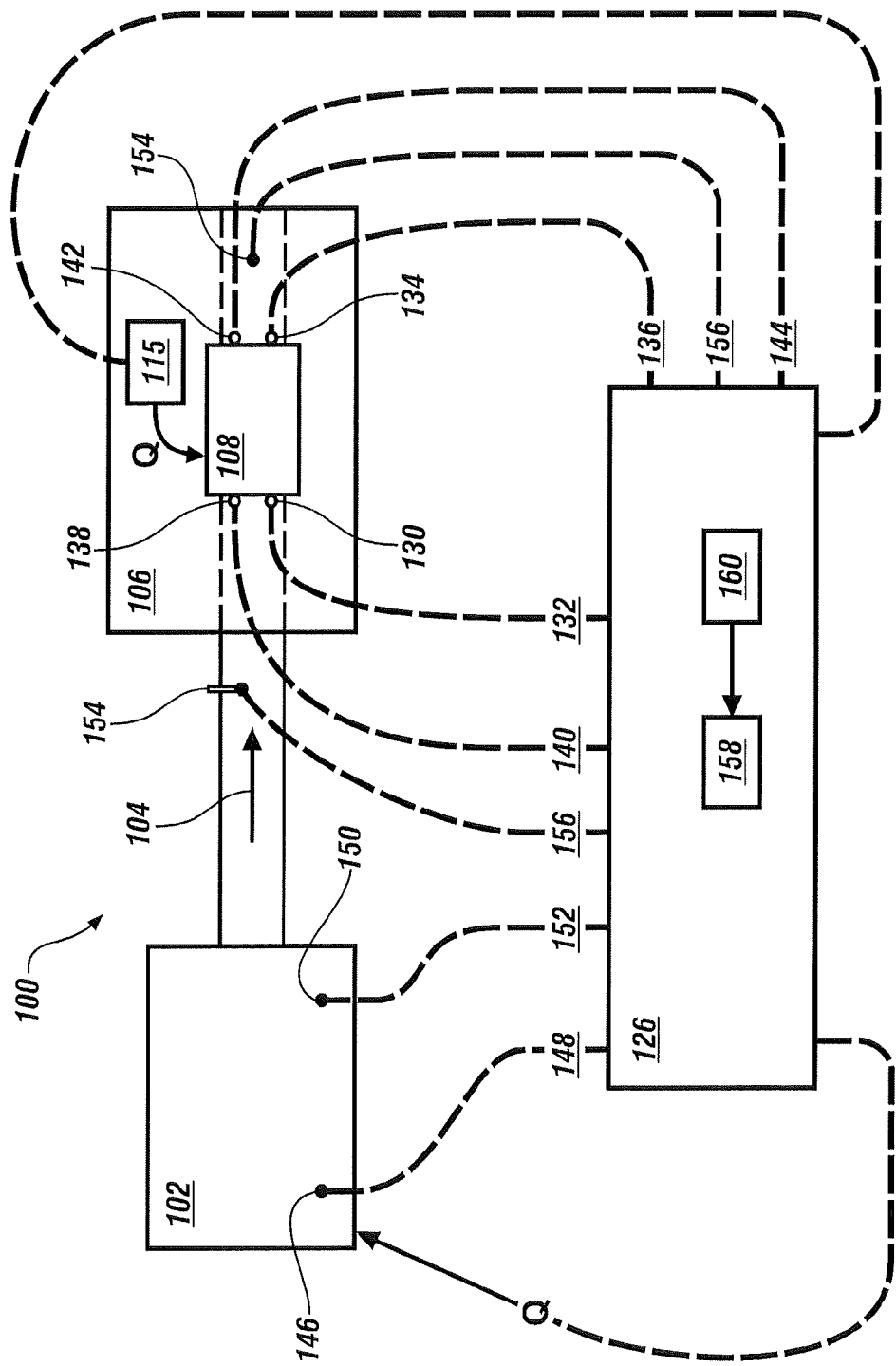
FIG. 2 is a schematic diagram showing an exemplary system for controlling regeneration within an after-treatment component of a compression-ignition engine.

In accordance with an exemplary embodiment of the invention, as shown in FIG. 1, and with reference to FIG. 2, an exemplary engine 102 discharges an exhaust stream 104 to an exhaust system 106. The exhaust system 106 includes after-treatment components 108 including a lean NOx trap (LNT) 110, a catalyzed particulate filter (PF) 112, and a selective catalytic reduction component (SCR) 114. A fuel injector 116 is disposed and configured for injecting a stream of fuel into the exhaust stream 104 upstream from the after-treatment components 108. An electrically heated catalyst (i.e., heater or EHC) 118 is also disposed in the exhaust stream 104 upstream from the after-treatment components 108. The EHC 118 is coupled to a source of electrical power 120. The LNT 110 is disposed downstream from the EHC 118, the PF 112 is disposed downstream from the LNT 110, and the SCR 114 is disposed downstream from the PF 112. A NOx sensor 154 is disposed and configured for sensing a NOx concentration or an oxygen concentration of the exhaust stream 104 just downstream from the LNT 110 and the PF 112. Another NOx sensor 154 is disposed and configured for sensing a NOx concentration or an oxygen concentration of the exhaust stream 104 just downstream from the SCR 114. A urea injector 124 is disposed and configured for injecting a supply of reductant into the exhaust stream 104 upstream from the SCR 114. An air source 128 is positioned and configured for providing a supply of combustion air to the exhaust system 106 when the engine 102 is not operating. Thus, when the engine 102 is not operating, the exhaust stream 104 is provided by the air source 128.

In accordance with an exemplary embodiment of the invention, as shown in FIG. 2, and with reference to FIG. 1, an exemplary system 100 for controlling regeneration within an after-treatment component 108 includes a compression-ignition engine 102 coupled to an exhaust system 106. An exhaust stream 104 is delivered from engine 102 and passes through the exhaust system 106, within which the exhaust stream 104 is treated before being discharged to the atmosphere. Exhaust system 106 includes at least one after-treatment component 108, such as a lean NOx trap (LNT) 110. In an exemplary embodiment, the LNT 110 receives the exhaust stream 104 from (i.e., is in fluid communication with) the engine 102, and is configured to collect NOx constituents from the exhaust stream 104, particularly during lean engine operation. The LNT 110 may comprise an oxidation catalyst such as platinum (Pt), an adsorbent such as barium and/or other oxides, and a reduction catalyst such as rhodium (Rh). The adsorbent is configured to chemically bind with the NOx constituents generated during lean engine operation. When the adsorbent capacity becomes saturated, the system must be regenerated such that the collected NOx is released from the adsorbent and reduced to nitrogen over the reduction catalyst.

In an exemplary embodiment, the exhaust system 106 includes a second after-treatment component 108 in the form of a catalyzed diesel particulate filter (DPF) 112, which may be positioned immediately downstream from the LNT 110 and configured for receiving the exhaust stream 104 from (i.e., being in fluid communication with) the LNT 110. The PF 112 is configured for removing particulate matter and other regulated constituents from the exhaust stream 104. A source of heat 115, such as an electrically heated catalyst (EHC) 118 positioned just upstream from the LNT 110 or a fuel injector 116 positioned in the exhaust stream 104 upstream from the after-treatment component 108, is configured for adding heat energy to the exhaust stream 104 to induce regeneration in the LNT 110 and/or the PF 112. A selective catalytic reduction component (SCR) 114 may be positioned downstream from (i.e., in fluid communication with) the PF 112 and configured for converting NOx, with the aid of a catalyst, into diatomic nitrogen, $N_2$, and water, $H_2O$.

A regeneration controller 126 is configured to predict when it may be necessary or advantageous to undergo regeneration in one or more of the after-treatment components 108 and, when appropriate, to actively facilitate a regeneration event. The regeneration controller 126 may facilitate such an event, for example, by introducing heat to the after-treatment component 108 from an outside source such as the heater 118 or by causing injection of fuel into the engine 102 or the exhaust system 106. In addition, in the event that it is desirable to facilitate a regeneration event at a time when the engine 102 is not operating, an air source 128 may be utilized so as to produce a supply of combustion air to the exhaust system 106. For example, a turbine 129 or an air pump 131 may be driven in reverse so as to pump air into the exhaust system 106. In such cases, the exhaust stream 104 includes air provided by the air source 128.

To enable the regeneration controller 126 to better perform its functions, various instruments are positioned within the engine 102 and the exhaust system 106. The instruments are configured to be responsive to changes in relevant parameters in the engine 102 and the exhaust system 106 and to transmit signals to the regeneration controller 126 with the signals being indicative of operation of the engine 102 and the exhaust system 106, including its after-treatment components 108. For example, in an exemplary embodiment, an upstream pressure sensor 130 measures pressures of the exhaust stream 104 upstream from the after-treatment component 108 and produces upstream pressure signals 132. Similarly, a downstream pressure sensor 134 measures pressures of the exhaust stream 104 downstream from the after-treatment component 108 and produces downstream pressure signals 136. In addition, an upstream temperature sensor 138 measures temperatures of the exhaust stream 104 upstream from the after-treatment component 108 and produces upstream temperature signals 140. A downstream temperature sensor 142 measures temperatures of the exhaust stream 104 downstream from the after-treatment component 108 and produces downstream temperature signals 144. An engine speed sensor 146 senses speeds of the engine 102 and produces engine speed signals 148. An engine flow sensor 150 senses mass flow rates of working fluid (e.g., air or air and fuel or exhaust gas) flowing in the engine 102 or exhaust system 106 and produces engine flow rate signals 152.

A NOx sensor 154 is positioned in the exhaust downstream from the after-treatment component 108 and is configured for sensing a quantity or concentration of NOx constituents in the exhaust stream 104 and for sending a NOx signal 156 indicative of the sensed quantity or concentration of NOx constituents in the exhaust stream 104. In an exemplary embodiment, the NOx sensor 154 is a post EHC/LNT Wide Range Oxygen Sensor/NOx sensor. NOx signals 156 produced by NOx sensor 154 are suitable for enabling the regeneration controller 126 to maintain a desired combustion mixture in the exhaust system 106 during a regeneration event. For example, the desired combustion mixture may be just rich of stoichiometry and may be maintained until regeneration is completed (e.g., until the LNT 110 is purged of accumulated NOx and/or PM).

The regeneration controller 126 receives information, such as one or more of the upstream pressure signals 132, downstream pressure signals 136, upstream temperature signals 140, downstream temperature signals 144, engine speed signals 148, engine flow rate signals 152, and NOx signals 156 from the upstream pressure sensor 130, the downstream pressure sensor 134, the upstream temperature sensor 138, the downstream temperature sensor 142, the engine speed sensor 146, the engine flow sensor 150, and the NOx sensor 154. A processor 158 of the regeneration controller 126 cooperates with a memory 160 associated with the regeneration controller 126 to execute instructions that are configured to enable the regeneration controller 126 to monitor NOx and/or PM loading in the after-treatment component 108, to determine or anticipate when regeneration in the after-treatment component 108 may be necessary or desirable, to facilitate a regeneration event in the after-treatment component 108, and/or to effectuate control over a regeneration process or other remedial measures.

For example, in an exemplary embodiment, a regeneration controller 126 is configured to estimate a quantity of NOx and/or particulate matter accumulation in the after-treatment component 108 based operating parameters or based on feedback received from the exhaust system 106 (e.g., from a pressure decrease index that is indicative of a decrease in pressure of the exhaust stream 104 as it passes through the after-treatment component 108). In an exemplary embodiment, the regeneration controller 126 uses the upstream pressure signals 132 and the downstream pressure signals 136 to compute the pressure decrease index. In addition, the regeneration controller 126 uses the engine flow rate signals 152 or the engine speed signals 148 from the engine speed sensor 146 or the engine flow sensor 150 to generate a flow rate index. Still further, the regeneration controller 126 uses the upstream temperature signals 140 and the downstream temperature signals 144 to compute a temperature index indicative of a temperature of the exhaust stream 104 or of a change in temperature of the exhaust stream 104 as it passes through the after-treatment component 108. In situations where one or more of the temperature signals (e.g., one of the upstream temperature signals 140 and the downstream temperature signals 144) do not exist or are deemed unreliable, or in situations where greater detail in terms of temperatures within the after-treatment component 108 may be desired, a simulation model may be used to estimate one or more temperatures at one or more locations within the after-treatment component 108 based on other known temperatures. Then, based on the additional temperature detail, a more accurate temperature index may be generated.

Once the operating parameters (e.g., engine accumulated cycles or some other properties of the flow stream) have been generated, the regeneration controller 126 estimates a quantity of NOx and/or particulate matter accumulation in the after-treatment component 108. In an exemplary embodiment, the regeneration controller 126 uses a PM and/or NOx accumulation model based on empirical data. In another exemplary embodiment, the regeneration controller 126 uses a PM and/or NOx accumulation model based on the relationship between the pressure decrease index, the flow rate index, and the temperature index. As one skilled in the art will appreciate, increases in the amount of pressure decrease (i.e., change) at a constant flow rate and temperature may be indicative of accumulation of NOx and/or particulate matter in the after-treatment component 108. Those skilled in the art will also appreciate that the flow rate index may be normalized to a standardized temperature and a standardized pressure (e.g., according to the ideal gas law) so as to eliminate some or all of the inaccuracies associated with changes in temperature and pressure of the exhaust stream 104. This is possible because it is known that a consistent relationship may exist between pressure loss and such a corrected flow rate even though temperature and/or pressure of the flow may change.

Figure 3:
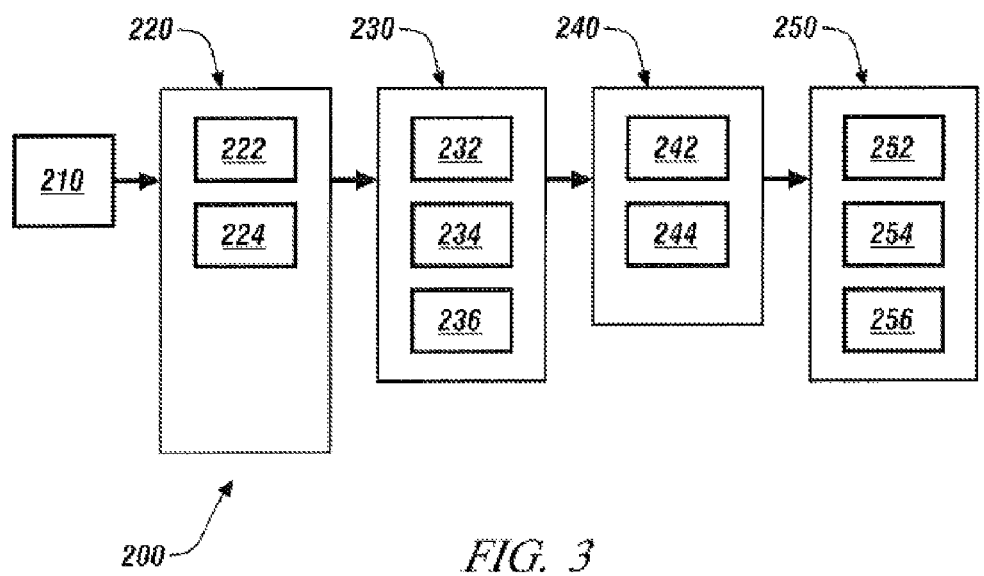
FIG. 3 is a process flow diagram showing an exemplary process for controlling regeneration within an after-treatment component of a compression-ignition engine.

In accordance with an exemplary embodiment of the invention, as shown in FIG. 3, an exemplary process 200 for controlling regeneration within an after-treatment component 108, such as a particulate filter, generally includes the step of receiving one or more values of one or more parameters associated with an exhaust stream 104 passing through the after-treatment component 108 (step 210). In an exemplary embodiment, the parameter may represent upstream pressure, downstream pressure, upstream temperature, downstream temperature, engine speed, engine flow rate, oxygen concentration, or NOx concentration. The value may be received as a signal from the upstream pressure sensor 130, the downstream pressure sensor 134, the upstream temperature sensor 138, the downstream temperature sensor 142, the engine speed sensor 146, the engine flow sensor 150, and/or the NOx sensor 154. The parameter may be a pressure decrease index indicative of a decrease in pressure of an exhaust stream 104 as it passes through the after-treatment component 108, a flow rate index indicative of a rate of flow of the exhaust stream 104, a temperature index indicative of a temperature of the exhaust stream 104, an oxygen concentration index indicative of an oxygen concentration in the exhaust stream 104 or a NOx concentration index indicative of a NOx concentration in the exhaust stream 104.

In addition to receiving one or more values, the process 200 includes evaluating whether a parameter indicative of a need for regeneration in the after-treatment component 108 exceeds a predetermined threshold (step 220). In an exemplary embodiment, the regeneration controller 126 monitors NOx signals 156 from the NOx sensor 154 that are indicative of the sensed quantity or concentration of NOx constituents in the exhaust stream 104 and determines whether the sensed concentration of NOx in the exhaust stream 104 exceeds or is less than a predetermined threshold configured for indicating when regeneration should be performed.

When it is determined that the parameter (e.g., NOX concentration) does in fact exceed the predetermined threshold, the regeneration controller 126 concludes that a regeneration event is needed and thus sets an LNT regeneration switch to true (step 222). When it is determined that the parameter (e.g., NOX concentration) does not exceed the predetermined threshold, the regeneration controller 126 concludes that a regeneration event is not necessary and accordingly sets the LNT regeneration switch to false (step 224). Steps 220, 222, and 224 may be repeated continuously, intermittently (e.g., non-continuously, following periods of interruption), or periodically (e.g., at regular time intervals).

When the LNT regeneration switch is set to true, the regeneration controller 126 detects whether the engine 102 is in an operating state or a non-operating state (step 230). In an exemplary embodiment, and operating state may be characterized by an engine speed signal, or another signal indicative of engine operation, exceeding a predetermined minimum threshold, such as 500 rpm. When it is determined that the signal (e.g., engine speed) does in fact exceed the predetermined threshold, the regeneration controller 126 sets an engine operation switch to true (step 232). When it is determined that the signal does not exceed the predetermined threshold, the regeneration controller 126 sets the engine operation switch to false (step 234). Steps 230, 232, and 234 may be repeated continuously, intermittently (e.g., non-continuously, following periods of interruption), or periodically (e.g., at regular time intervals) while the LNT regeneration switch is set to true. In an exemplary embodiment, the regeneration controller 126 monitors a status of the engine operation switch (step 236) so as to determine when the engine 102 has undergone a change in state (e.g., from an operating state to a non-operating state).

As soon as the engine operation switch is set to false while the LNT regeneration switch is set to true, the regeneration controller 126 may initiate (i.e., facilitate) a regeneration event (step 240). In an exemplary embodiment, the initiation of the regeneration event (step 240) is performed immediately (or following a relatively brief, predefined time lag) following detection that the engine 102 has undergone a change in state (e.g., from an operating state to a non-operating state). In one exemplary embodiment, a regeneration event is initiated by activating an electrically heated catalyst (EHC) (step 242). While the engine 102 is not operating (i.e., the engine operation switch is set to false), LNT regeneration is indicated (i.e., the LNT regeneration switch is set to true), and the EHC is activated, the regeneration controller 126 establishes whether a temperature of the EHC is greater than a predetermined EHC temperature threshold or is less than the predetermined EHC temperature threshold (step 244). If the temperature of the EHC is greater than the predetermined EHC temperature threshold, the regeneration controller 126 may initiate a flow of fuel (step 250) through one or more injectors into the exhaust stream 104 so as to decrease the air/fuel ratio of the exhaust stream 104.

While fuel is being injected into the exhaust stream 104 (step 250), the regeneration controller 126 monitors (step 252) the air/fuel ratio of the exhaust stream 104 such as by receiving signals from an oxygen sensor that are indicative of the sensed quantity or concentration of available oxygen in the exhaust stream 104. If the concentration of available oxygen indicates that the actual air/fuel ratio is greater than a predetermined air/fuel threshold (e.g., a targeted mixture such as just rich of stoichiometric), the regeneration controller 126 may increase the flow of fuel (step 254) into the exhaust stream 104 so as to decrease the air/fuel ratio of the exhaust stream 104 (e.g., to better match the targeted ratio). If the available oxygen indicates that the actual air/fuel ratio is less than the predetermined air/fuel threshold, the regeneration controller 126 may decrease the flow of fuel (step 256) into the exhaust stream 104 so as to increase the air/fuel ratio of the exhaust stream 104. Accordingly, the regeneration controller 126 may maintain operating conditions in the LNT 110 that are favorable for regeneration.

While the regeneration controller 126 is facilitating the regeneration event (step 240), the regeneration controller 126 continuously re-evaluates the selected parameter exceeds the predetermined threshold, and thus deciding whether a need for regeneration in the after-treatment component 108 continues to exist (step 220). As described above, the regeneration controller 126 may accomplish this by monitoring NOx signals 156 from the NOx sensor 154 that are indicative of the sensed quantity or concentration of NOx constituents in the exhaust stream 104 and determining whether the sensed concentration of NOx in the exhaust stream 104 exceeds or is less than a predetermined threshold configured for indicating when regeneration should be performed. While the sensed concentration of NOx in the exhaust stream 104 continues to exceed the predetermined threshold, the regeneration controller 126 leaves the LNT regeneration switch set to true (step 222). When it is determined that the parameter (e.g., NOX concentration) no longer exceeds the predetermined threshold, the regeneration controller 126 sets the LNT regeneration switch to false (step 224) and the regeneration event is terminated.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. A method for controlling regeneration within an after-treatment component of an engine, comprising:
    estimating at least one of a quantity of NOx and particulate matter accumulated in the after-treatment component;
    receiving a signal indicative of whether the engine is in one of an operating state and a non-operating state;
    detecting, based on the signal, when the engine has departed an operating state and entered a non-operating state; and
    initiating a regeneration event of the after-treatment component when the engine has departed the operating state and entered the non-operating state, and the estimated accumulation of the at least one of NOx and particulate matter exceeds a predetermined threshold indicative of a need for regeneration of the after-treatment component, wherein initiating the regeneration event comprises:
        causing, when the engine is in the non-operating state, a stream of air to flow through the after-treatment component;
        activating an electrically heated catalyst upstream of the after-treatment component;
        initiating a flow of fuel into the stream of air when a temperature of the electrically heated catalyst is above a predetermined threshold; and
        maintaining operating conditions in a lean NOx trap (LNT), based on signals from an oxygen sensor and a NOx sensor, and selectively controlling a combustion mixture of the fuel and air to establish a predefined air to fuel ratio by selectively increasing and decreasing the amount of fuel injected into the air flow.

2. The method of claim 1, further comprising modulating the flow of fuel to achieve a ratio of fuel to air in the after-treatment component that is more rich than stoichiometric.

3. The method of claim 1, wherein the flow of fuel is modulated to achieve a ratio of fuel to air in the after-treatment component that is only slightly more rich than stoichiometric.

4. The method of claim 1, wherein the flow of fuel is modulated to achieve a ratio of fuel to air in the after-treatment component that varies between a state of being more rich than stoichiometric and a state of being less rich than stoichiometric.

5. The method of claim 1, wherein said initiating a regeneration event is performed immediately after the engine has departed an operating state and entered a non-operating state.

6. The method of claim 1, wherein said initiating a regeneration event is performed for a predetermined threshold time after the engine has departed an operating state and entered a non-operating state.

7. The method of claim 1, wherein said initiating a regeneration event comprises activating an electrically heated catalyst.

8. The method of claim 7, further comprising establishing, while the engine is in a non-operating state and the electrically heated catalyst is activated, whether a temperature of the electrically heated catalyst is greater than a predetermined electrically heated catalyst temperature threshold or is less than the predetermined electrically heated catalyst temperature threshold.

9. The method of claim 8, wherein said initiating a flow of fuel into the stream of air is performed only when the temperature of the electrically heated catalyst is greater than the predetermined electrically heated catalyst temperature threshold.

10. The method of claim 1, further comprising monitoring a ratio of fuel to air of the stream of air.

11. The method of claim 10, wherein said monitoring an air/fuel ratio of an exhaust stream comprises receiving an available oxygen signal from an oxygen sensor, the available oxygen signal being indicative of a concentration of available oxygen in the stream of air.

12. The method of claim 11, further comprising increasing the flow of fuel into the stream of air if the concentration of available oxygen indicates that the air/fuel ratio is greater than a predetermined air/fuel threshold.

13. The method of claim 12, further comprising decreasing the flow of fuel into the stream of air if the concentration of available oxygen indicates that the air/fuel ratio is less than a predetermined air/fuel threshold.

14. The method of claim 1, further comprising:
receiving a regeneration signal indicative of whether a need exists for regeneration in the after-treatment component;
deciding, based on the regeneration signal, whether a need exists for regeneration in the after-treatment component; and
if the need does not exist for regeneration in the after-treatment component, terminating the regeneration event.

15. The method of claim 14, wherein the regeneration signal comprises a NOx signal indicative of a NOx concentration downstream from the after-treatment component.

16. The method of claim 15, wherein said deciding comprises evaluating whether the NOx signal indicates that the NOx concentration downstream from the after-treatment component exceeds a predetermined threshold.

17. The method of claim 1, wherein the operating state is characterized by an engine speed signal that exceeds a predetermined threshold.

18. The method of claim 1, further comprising:
continuously estimating, during the regeneration event, the at least one of the quantity of NOx and PM accumulated in the after-treatment component; and
ceasing the regeneration event when the estimated accumulation in the after-treatment component is below a predetermined threshold.

19. The method of claim 18, further comprising:
generating a pressure decrease index based on pressure measurements upstream and downstream of the after-treatment component;
generating a flow rate index based on at least one of measurements from an engine flow sensor and measurements from an engine speed sensor; and
generating a temperature index based on temperature measurements upstream and downstream of the after-treatment component;
wherein said estimating the at least one of the quantity of NOx and particulate matter accumulated in the after-treatment component is based on the generated pressure decrease index, the generated flow rate index, and the generated temperature index.

20. The method of claim 19, wherein in the non-operating state the engine is off.

* * * * *